United States Patent
Eichhorn et al.

(10) Patent No.: US 12,265,251 B2
(45) Date of Patent: Apr. 1, 2025

(54) DISPLAY DEVICE FOR A MOTOR VEHICLE

(71) Applicant: Hella GmbH & Co. KGaA, Lippstadt (DE)

(72) Inventors: Karsten Eichhorn, Wadersloh (DE); Markus Giehl, Jena (DE); Daniela Karthaus, Lippstadt (DE); Christian Schmidt, Paderborn (DE); Benjamin Willeke, Paderborn (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/664,454

(22) Filed: May 23, 2022

(65) Prior Publication Data

US 2022/0283364 A1   Sep. 8, 2022

Related U.S. Application Data

(63) Continuation of application No. PCT/EP2020/081901, filed on Nov. 12, 2020.

(30) Foreign Application Priority Data

Nov. 28, 2019   (DE) ...................... 10 2019 132 252.9

(51) Int. Cl.
*G02B 6/06*     (2006.01)
*F21V 8/00*     (2006.01)
(Continued)

(52) U.S. Cl.
CPC .............. *G02B 6/06* (2013.01); *G02B 6/0008* (2013.01); *B60K 35/00* (2013.01); *B60K 35/22* (2024.01);
(Continued)

(58) Field of Classification Search
CPC ............ B60K 35/00; B60K 2370/1523; B60K 2370/336; B60K 2370/178; G02B 6/0008;
(Continued)

(56) References Cited

U.S. PATENT DOCUMENTS

| | | |
|---|---|---|
| 5,251,280 A | 10/1993 | Asada et al. |
| 6,476,378 B2 | 11/2002 | Nougaret et al. |

(Continued)

FOREIGN PATENT DOCUMENTS

| | | |
|---|---|---|
| DE | 102004051062 A1 | 5/2006 |
| DE | 112015006361 T5 | 11/2017 |

(Continued)

*Primary Examiner* — Anabel Ton
(74) *Attorney, Agent, or Firm* — Husch Blackwell LLP

(57) ABSTRACT

A display device for a motor vehicle is provided. The display device includes at least one display with a display surface for displaying content via a plurality of pixels. The display device comprises a light-guiding lens with at least one entry surface and an exit surface. During operation of the display device the light emitted from the display surface enters the light-guiding lens through the at least one entry surface and is emitted by an exit surface, such that the content is shown on the exit surface. In one embodiment, the exit surface features a different shape. In another embodiment, the exit surface is a different size than the at least one display surface. In another embodiment, the display device comprises several displays with display surfaces at distances to each other, and the light-guiding lens features merely one exit surface or several exit surfaces directly adjoining each other.

14 Claims, 3 Drawing Sheets

(51) Int. Cl.
 *B60K 35/00* (2024.01)
 *B60K 35/22* (2024.01)
 *B60K 35/28* (2024.01)

(52) U.S. Cl.
 CPC ...... *B60K 35/28* (2024.01); *B60K 2360/1523* (2024.01); *B60K 2360/178* (2024.01); *B60K 2360/336* (2024.01)

(58) Field of Classification Search
 CPC .... G02B 6/06; B60Q 2400/50; B60Q 1/5037; B60Q 1/503
 See application file for complete search history.

(56) References Cited

U.S. PATENT DOCUMENTS

| | | |
|---|---|---|
| 10,120,233 B2 | 11/2018 | Yang et al. |
| 2019/0168663 A1* | 6/2019 | Nykerk ................ B60Q 1/5037 |

FOREIGN PATENT DOCUMENTS

| | | | | |
|---|---|---|---|---|
| DE | 102018004176 A1 | 11/2018 | | |
| DE | 102017220355 A1 | 5/2019 | | |
| DE | 102017222203 A1 | 6/2019 | | |
| DE | 102019204670 A1 | 10/2019 | | |
| DE | 102018213820 A1 * | 2/2020 | ............. | B60K 35/00 |
| WO | WO-2020166286 A1 * | 8/2020 | ............. | B60K 35/00 |

* cited by examiner

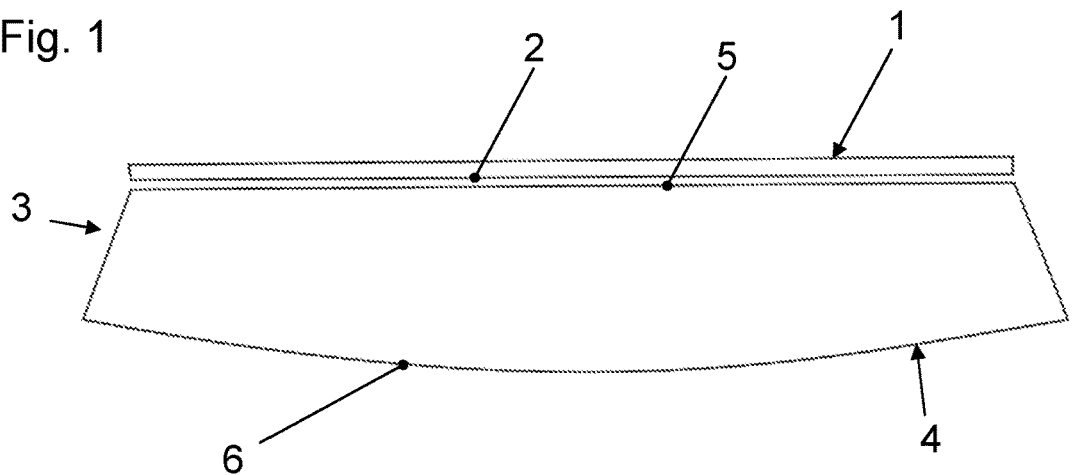
Fig. 1
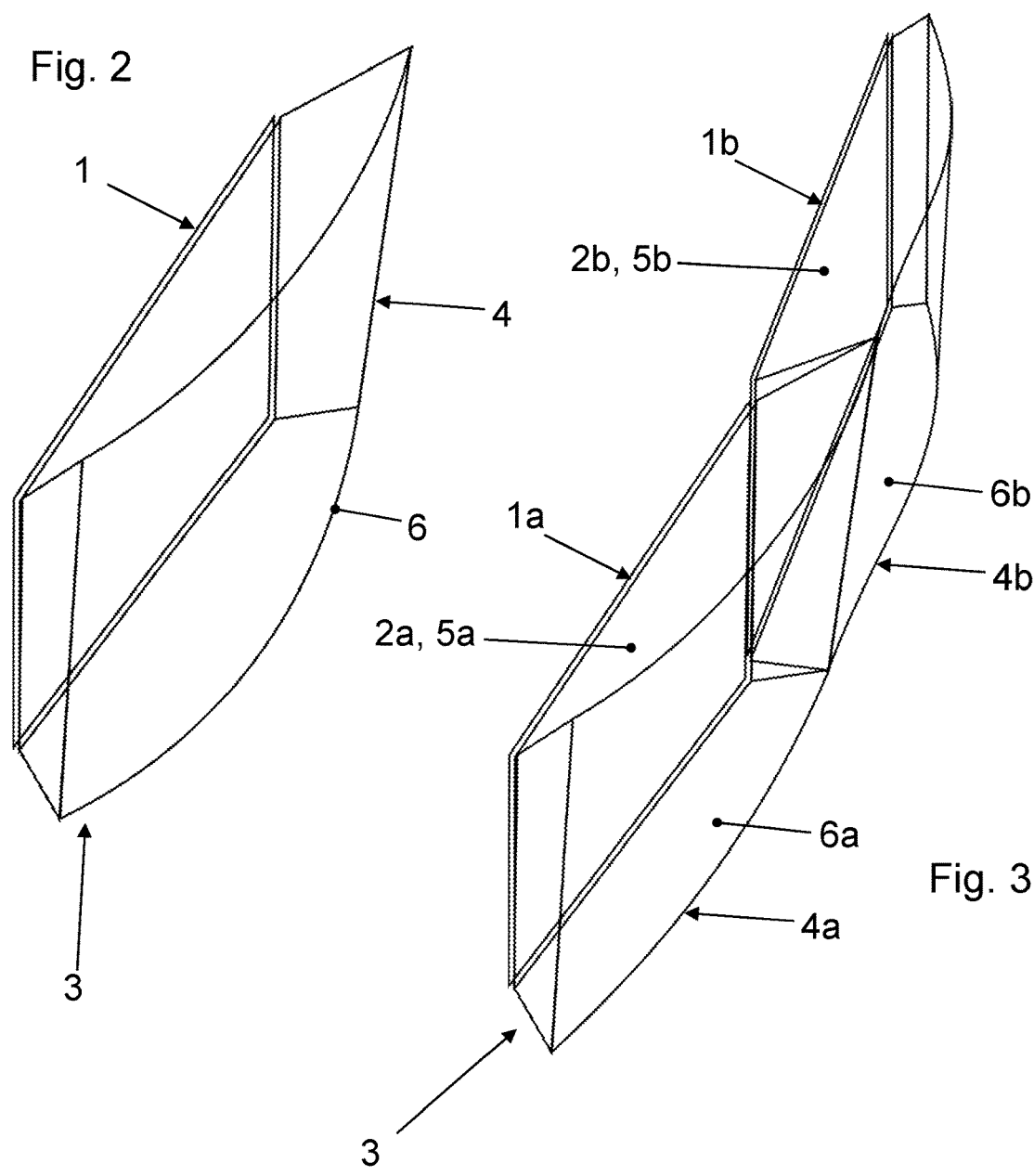
Fig. 2
Fig. 3

DISPLAY DEVICE FOR A MOTOR VEHICLE

CROSS-REFERENCE TO RELATED APPLICATIONS

This application claims priority to and is a continuation of PCT Application No. PCT/EP2020/081901, filed Nov. 12, 2020, which itself claims priority to German Application No. 10 2019 132252.9, filed Nov. 28, 2019, the entireties of both of which are hereby incorporated by reference in their entireties.

FIELD OF THE INVENTION

The present invention relates to a display device for a motor vehicle.

BACKGROUND OF THE INVENTION

A display device of the aforementioned type is known from DE 10 2017 107 646 A1. One of the display devices described therein comprises an LC display for displaying content to be shown. The LC display is arranged, for example, in the rear area of the vehicle in such a way that the content displayed on the display can be registered by an observer outside the vehicle.

Displays that are used for displaying safety-relevant information on the vehicle usually originate from the display industry. Such displays are flat and mostly rectangular. The illuminated surfaces in automobile illumination devices such as headlamps or rear lamps usually have angles and inclinations. In addition, very many surfaces are curved. It is not possible to follow such contours using flat displays. In addition, the displays known from the display industry are only able to transmit one piece of information at a time to a recipient. Consequently, the information to be shown on such displays always have to be aligned to all recipients.

SUMMARY OF THE INVENTION

In communications between automated vehicles and other road users, it is desirable to transmit information only in a certain direction.

The problem underlying the present invention is to create a display device of the kind mentioned at the beginning of the document that is adapted to typical contours of a motor vehicle and/or can transmit selective information in various directions.

In an example embodiment, it is intended that the display device comprises a light-guiding lens with at least one entry surface and an exit surface, where during operation of the display device the light emitted from the display surface of the at least one display enters the light-guiding lens through the at least one entry surface and is emitted from the exit surface in such a way that the content is displayed on the exit surface, where the exit surface features a different shape and/or a different size than the at least one display surface, and/or where the display device comprises several displays with display surfaces at distances to each other and the light-guiding lens features merely an exit surface or several exit surfaces adjoining each other.

Such a design makes it possible to adapt the display device to the design, for example, of a headlamp or a rear lamp. In this respect, the exit surface can in particular feature an aspect ratio that is different from the aspect ratio or the at least one display surface. The exit surface can have an angle or an inclination. Alternatively or additionally, the at least one display can be flat and the exit surface can be curved. This makes it possible to integrated the display device, for example, into curved rear lamps. In this respect, the light-guiding lens generates an image of the at least one pixelated display surface of the display(s) on the curved exit surface. The aspect ratio of one or a number of displays can be adapted to different requirements by a corresponding light-guiding lens design.

It can be intended that the display device comprises several displays in particular at distances to each other, each with a display surface, where the light-guiding lens comprises a plurality of light-guiding lens components and where each of the display surfaces is allocated to one of the lens components, such that the light emitted by the respective display surface enters the allocated lens component through an entry surface of the same, in particular where the light entering through the individual entry surfaces of the lens components is emitted though a common exit surface or through several exit surfaces adjoining each other. In this respect, the light-guiding lens can in particular be designed in such a way that during operation of the display device the light emitted by several display surfaces is emitted through the exit surface or through several exit surfaces adjoining each other, where several display surfaces are displayed next to each other, preferentially seamlessly next to each other, in particular on the exit surface or the several exit surfaces adjoining each other. In this way, it is possible for the light-guiding lens to close a gap due to the design between the display surfaces of the displays in such a way that, for example, the curved exit surface creates the appearance of a single display.

There is the possibility that the at least one entry surface of the light-guiding lens comes into contact with the at least one display surface. This ensures that the light creating the content displayed on the display surface enters the light-guiding lens or the light-guiding lens components with virtually no loss.

It can be intended that the display device comprises a deflection unit that is arranged on the exit surface of the light-guiding lens, where the deflection unit features in particular a plurality of deflection elements that are designed to be refractive or diffractive or holographic. In this context, the deflection unit can allocate different groups of pixels of the light emitted from the exit surface to different solid angles in such a way that different contents can be transmitted in different solid angles. This is advantageous in communications between automated vehicles and other road users. The vehicle is the able, for example, to display a different content in a first solid angle in which there is a pedestrian than in a second solid angle in which there is a bicycle or another vehicle. In this respect, each of the deflection elements can deflect a group of pixels in each case. In particular, each of the deflection elements can, in this respect, contribute to each of the images transmitted in different solid angles. This also makes it possible for the contents transmitted in different solid angles to be displayed on the entire exit surface.

If the display device uses displays with a large number of pixels so that there are very many pixels per deflection element, it will be possible to create objects stereoscopically in 3D through the deflection unit.

There is the possibility that the light-guiding lens, in particular each one of the light-guiding lens components features on the basis of the at least one display surface an expanding cross-section, where the cross-section is preferentially in the shape of a truncated cone or a truncated pyramid and the smaller diameter of the truncated cone or the truncated pyramid is facing the at least one display surface. Such a geometry makes it possible to close the distances between the display surfaces of different displays by simple means. There is, however, also the possibility that the exit surface of the light-guiding lens is smaller than the display surface of the respective display. In this case, the larger diameter of the truncated cone or of the truncated pyramid is facing the at least one display surface.

It can be intended that the light conduction within the light-guiding lens, in particular within each one of the light-guiding lens components is based on Anderson localization, preferentially transverse Anderson localization. The transverse Anderson localization brings about a situation where the light is able to propagate in the light-guiding lens or in the light-guiding lens components essentially exclusively in the direction in which the entry surface and the exit surface are opposite each other. In this way, it is ensured that the arrangement of the pixels on the display surface of the display corresponds to a large extent exactly to the arrangement of the pixels on the exit surface of the light-guiding lens or the light-guiding lens components. Such a design of the light-guiding lens makes it possible to transfer the flat shape of displays into any curved shape while maintaining the image information.

There is the possibility that the light-guiding lens, in particular each one of the lens components, features at least two transparent, light-guiding materials with differing refractive indices, where one of the materials can, for example, be air. Two light-guiding materials with different refractive indices can cause the occurrence of transverse Anderson localization. In this respect, the effect is greater if the difference in the refractive indices is as large as possible. The transparent, light-guiding materials can be in particular plastic, glass or ceramic.

It can be intended that the light-guiding lens, in particular each one of the light-guiding lens components, comprises a plurality of fibers, where preferentially the individual fibers feature a cross-section of less than 500 nm. The occurrence of the transverse Anderson localization is likewise favored by the dimensions of the fibers in the range of the wavelength of the visible light or in a size range that is smaller than the wavelength of the visible light.

There is the possibility that the light-guiding lens, in particular each one of the lens components, comprises a plurality of first fibers with a first refractive index and a plurality of second fibers with a second refractive index differing from the first one. In this respect, the alternating fibers correspond to the two transparent light-guiding materials with refractive indices differing from each other.

It can be intended that the at least two transparent, light-guiding materials with differing refractive indices, in particular the first and the second fibers are arranged at random in transverse directions to each other, where the transverse directions to the direction of propagation of the light propagated from the at least one entry surface to the exit surface are vertical. This means that the at least two optical materials with differing refractive indices are arranged stochastically or at random along two transverse dimensions of the light-guiding lens or the light-guiding lens components and run homogeneously along the third dimension, where the third dimension corresponds to the direction of propagation of the light propagating from the at least one entry surface to the exit surface. The refractive index is thus constant in one dimension along the respective fiber and randomized across all fibers along the two other dimensions. This favors the occurrence of the transverse Anderson localization such that the light propagates essentially exclusively in the third dimension or in the direction in which the entry surface and the exit surface are opposite each other.

There is the possibility that the light-guiding lens, in particular each one of the lens components, is created by the plurality of the first and the second fibers or a plurality of fibers with air pockets in random arrangement being pressed together, warmed and pulled, so that melding of the various fibers or fibers with air pockets gives rise to an intermixed light-guiding material with at least two different refractive indices. The warming and pulling makes it possible to reduce the cross-section of the fibers to dimensions smaller than 500 nm. Furthermore, this gives rise to a firm bond between the individual fibers. If only one kind of fiber with air pockets is used, warming and pulling causes the air pockets to become elongated air channels that extend between the entry surface and the exit surface. Furthermore, in this respect, the massive fibers and the air channels are also arranged stochastically or randomized.

It can also be intended that the display is designed as an LED display or as an OLED display or as an LC display or comprises an LED display or an OLED or an LC display. Such displays are suitable to make contact with the entry surface of the light-guiding lens without any intermediate space.

Preferentially, the display device can be integrated into a headlamp or a rear lamp. A corresponding design of the light-guiding lens makes it possible to adapt the exit surface to the design of the headlamp or the rear lamp.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 is a top view of a first embodiment of an inventive display device.

FIG. 2 is a perspective view of the display device according to FIG. 1.

FIG. 3 is a perspective view of a second embodiment of an inventive display device.

DETAILED DESCRIPTION OF THE DRAWINGS

Figure 4:
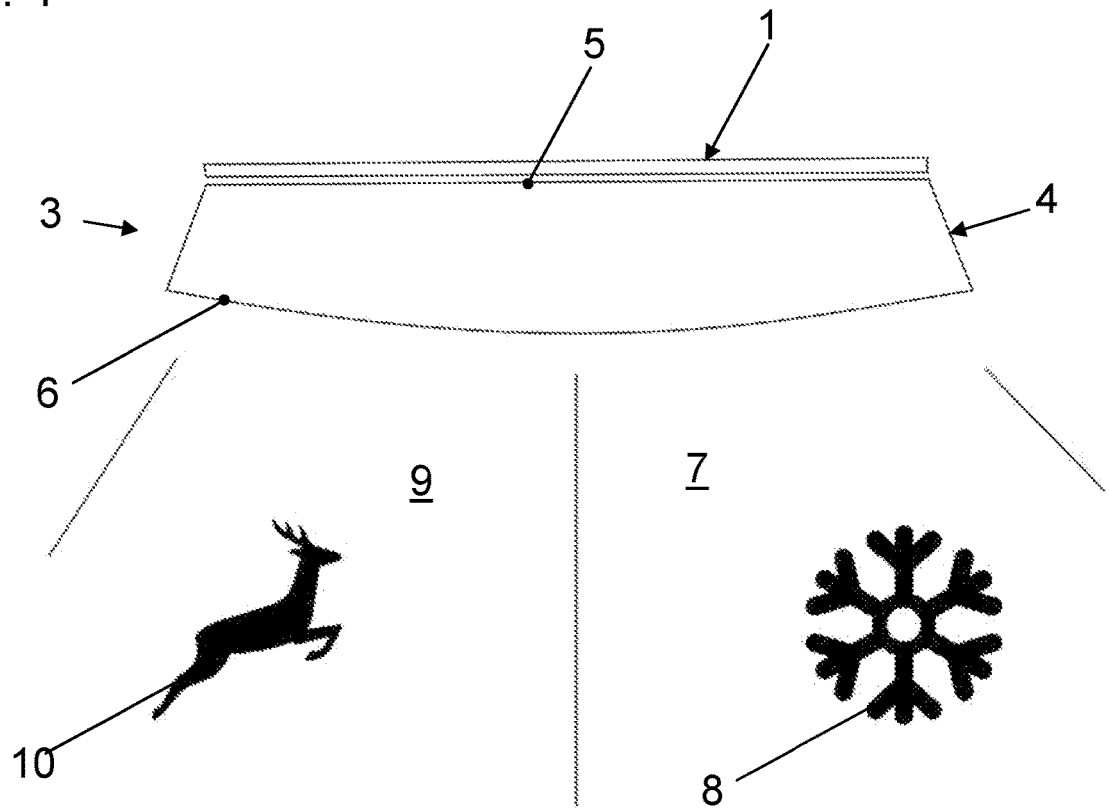
FIG. 4 is a top view of a third embodiment of an inventive display device.

In the figures, identical components and components with identical functions have been given the same reference numbers.

The embodiment of an inventive display device shown in FIG. 1 and FIG. 2 comprises a display 1 with a display surface 2. The display 1 can, for example, be designed as an LED display or as an OLED display or as an LC display. The display surface 2 is flat.

The embodiment shown in FIG. 1 and FIG. 2 of an inventive display device further comprises a light-guiding lens 3 that consists in particular of a light-guiding lens component 4 with an entry surface 5 and an exit surface 6. In this respect, the entry surface 5 is facing the display surface 2 of the display 1 and makes contact to the same, which is not shown in the schematic representations for reasons of clarity.

The light-guiding lens component 4 is essentially in the shape of a truncated pyramid, where the entry surface 5 has smaller dimensions than the exit surface 6. The lens component 4 expands starting from the entry surface 5 to the exit surface 6. The entry surface 5 is flat to be able to make contact over the entire surface to the display surface 2 of the display 1. The exit surface 6 is convex curved.

In the sample embodiment shown, the exit surface 6 features a rectangular outline. It is entirely possible to provide for another shape of exit surface.

The lens component 4 can consist of two transparent, light-guiding materials with differing refractive indices that in particular can be designed as first and as second fibers. The fibers may be arranged at random in transverse directions adjacent to each other, where the transverse directions are vertical to the direction in which the entry surface 5 and the exit surface 6 are opposite each other.

The refractive index is thus constant in one dimension along the respective fiber and randomized across all fibers along the two other dimensions, such that an effect known as the transverse Anderson localization occurs. Correspondingly, the light propagates inside the lens component 4 essentially exclusively in the third dimension or in the direction in which the entry surface and the exit surface are opposite each other. In this way, it is ensured that the arrangement of the pixels on the exit surface 6 of the light-guiding lens 3 or the light-guiding lens component 4 corresponds to a large extent exactly to the arrangement of the pixels on the display surface 2 of the display 1.

The embodiment of an inventive display device shown in FIG. 4 provides for a deflection unit (not shown) on the exit surface 6 of the lens component 4 of the light-guiding lens 3. This deflection unit shows a plurality of deflection elements that can be refractive or diffractive or holographic. In this respect, the deflective elements are designed to be very thin and applied to the exit surface 6 as a coating.

The deflection unit can allocate different groups of pixels of the light emitted from the exit surface 6 to different solid angles in such a way that different contents can be transmitted in different solid angles. This is advantageous in communications between autonomous vehicles and other road users. FIG. 4 shows that the display device is transmitting a warning of a slippery road in the form of a corresponding image 8 in a first solid angle 7 extending to the right in FIG. 4. In a second solid angle 9 extending to the left in FIG. 4, the display device is transmitting a warning of game animals crossing the road in the form of a corresponding image 10.

In this respect, each of the deflection elements can deflect a group of pixels in each case. In particular, each of the deflection elements can in this context contribute to each of the images 8, 10 that are transmitted in differing solid angles 7, 9. This means that the contents transmitted in different solid angles 7, 9 can also in each case be displayed on the entire exit surface 6.

The embodiment shown in FIG. 3 of an inventive display device provides for two displays 1a, 1b with two display surfaces 2a, 2b at distances to each other and a light-guiding lens 3 with two lens components 4a, 4b. In this context, the entry surfaces 5a, 5b of the lens components 4a, 4b each make contact with the display surfaces 2a, 2b.

The exit surfaces 6a, 6b of the lens components 4a, 4b adjoin each other essentially without any gap, such that the exit surfaces 6a, 6b offer a large, undivided surface for displaying content. This means that the light emitted from the two display surfaces 2a, 2b during operation of the display device can exit through the two adjacent exit surfaces 6a, 6b in such a way that the content displayed on the two display surfaces 2a, 2b can be displayed seamlessly on the two adjacent exit surfaces 6a, 6b. In this way, it is possible to close the gap due to the design between the two display surfaces 2a, 2b of the displays 1a, 1b such that the curved exit surface 6a, 6b creates the appearance of a single display.

Alternatively to this, a single-piece lens component can also be provided with two entry surfaces 4a, 4b and a continuous exit surface 5.

Figure 5:
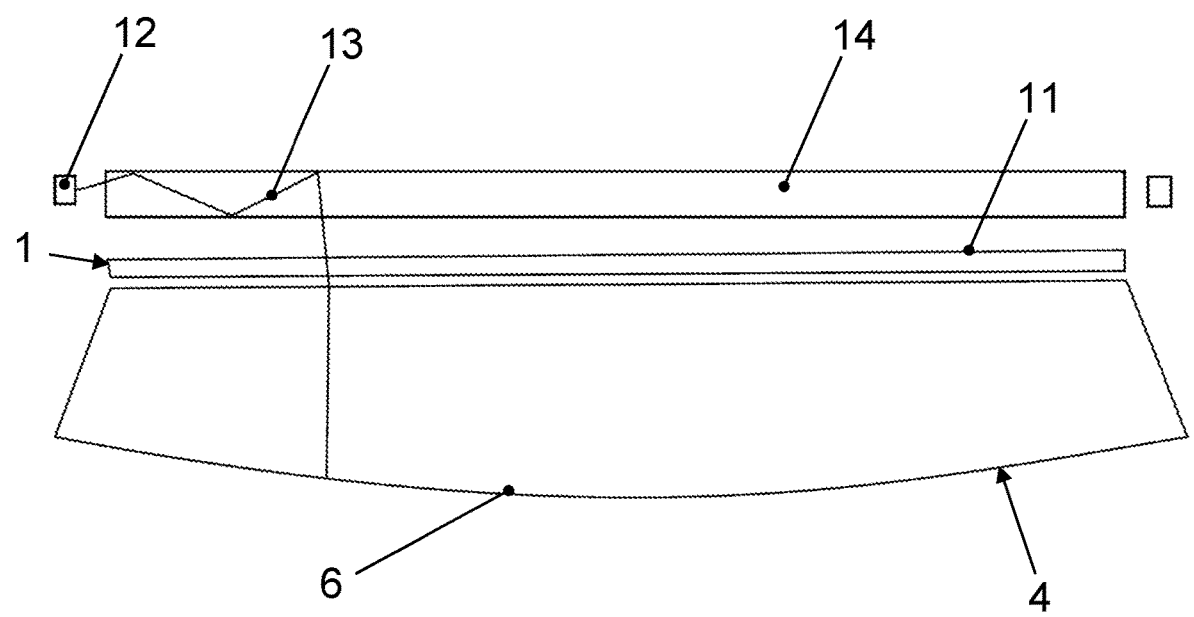
FIG. 5 is a top view of a fourth embodiment of an inventive display device.
Figure 6:
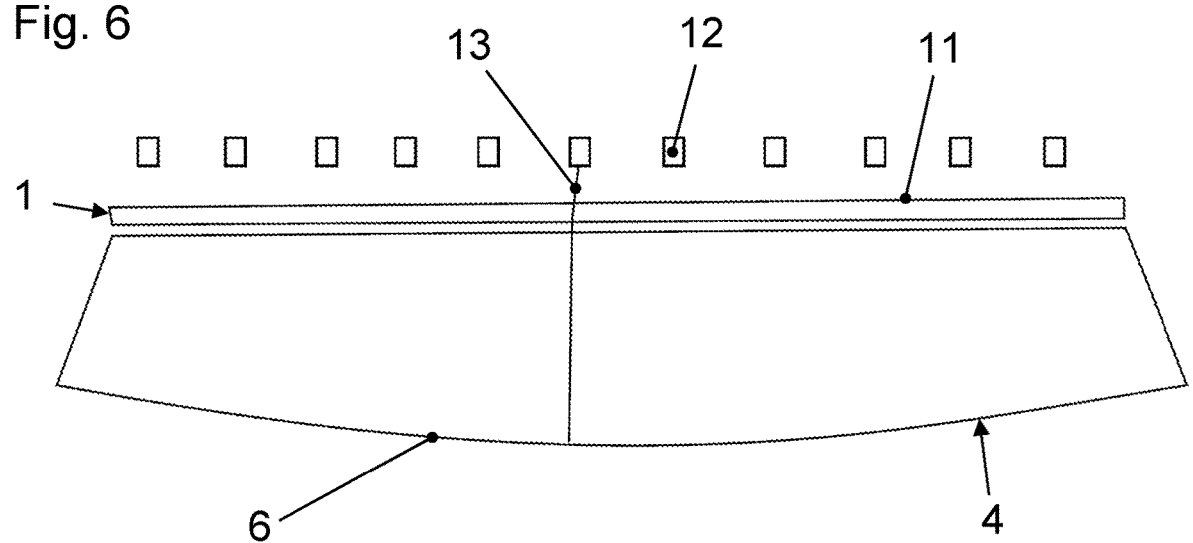
FIG. 6 is a top view of a fifth embodiment of an inventive display device.
Figure 7:
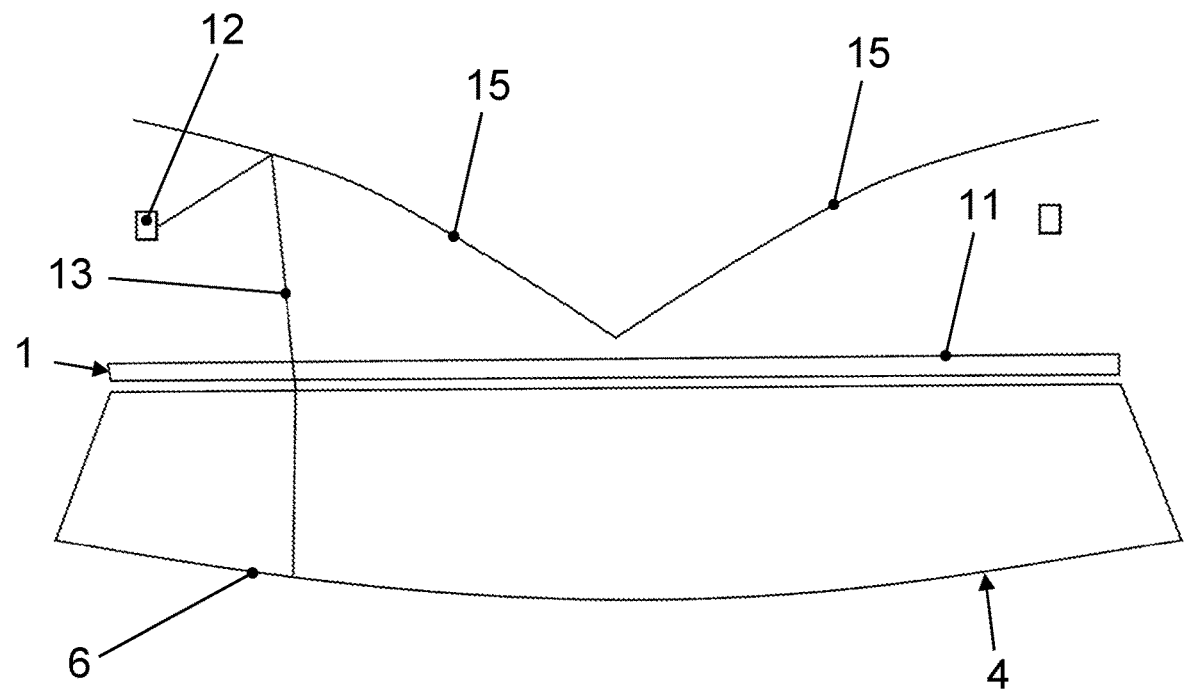
FIG. 7 is a top view of a sixth embodiment of an inventive display device.

In the embodiments according to FIG. 5 through 7, the display 1 takes the form of an LC display. FIG. 5 through FIG. 7 make clear various possibilities for illumination of the LC display from behind through the back 11 of the display 1.

In the case of the embodiment according to FIG. 5, light 13 emitted by a light source 12 is incoupled into a light guide 14, that extends behind the back 11 of the display 1. The light 13 is emitted from the light guide 14 through suitable structures and into the back 11 of the display 1. The light 13 emitted from display surface 2 of the display 1 enters the entry surface 5 of the lens component making contract to the former and is emitted from the latter through exit surface 6.

The embodiment according to FIG. 6 provides for a plurality of light sources 12 in the form of, for example, the light-emitting diodes (LEDs) behind the back 11 of the display 1 that directly illuminate the back 11.

The embodiment according to FIG. 7 provides for a plurality of light sources 12 in the form of, for example, the light-emitting diodes (LEDs) behind the back 11 of the display 1 that illuminate the back 11 through a plurality of mirrors 15.

LIST OF REFERENCE NUMBERS 1, 1a, 1b Display
2, 2a, 2b Display surface of the display
3 Light-guiding lens
4, 4a, 4b Light-guiding lens components of the light-guiding lens
5, 5a, 5b Entry surface of the light-guiding lens
6, 6a, 6b Exit surface of the light-guiding lens
7 First solid angle
8 Image transmitted into the first solid angle
9 Second solid angle
10 Image transmitted into the second solid angle
11 Back of the display
12 Light source
13 Light emitted from the light source
14 Light guide for the light emitted from the light source
15 Reflector for the light emitted from the light source

We claim:

1. A display device for a motor vehicle, the display device comprising:
   at least one display with a display surface for displaying content, where the content is displayed on the at least one display surface by light emanating from a plurality of pixels of the at least one display surface;
   a light-guiding lens with at least one entry surface and an exit surface;
   a deflection unit arranged on the exit surface of the light-guiding lens, wherein the deflection unit features one or more deflection elements that are designed to be at least one of refractive, diffractive, and holographic;

wherein the light emitted from the at least one display surface enters the light-guiding lens through the at least one entry surface and is emitted by the exit surface such that the content is shown on the exit surface;
wherein at least one of:
the exit surface has a different shape than the at least one display surface;
the exit surface has a different size than the at least one display surface; and
the display device comprises several displays with display surfaces at distances to each other, and the light-guiding lens includes one or more exit surfaces adjoining each other.

2. The display device in accordance with claim 1, wherein at least one of:
the exit surface features an aspect ratio that differs from the aspect ratio of the at least one display surface; and
the exit surface is curved and the at least one display surface is flat.

3. The display device in accordance with claim 1, wherein the display device comprises several displays at distances to each other, each with a display surface,
wherein the light-guiding lens comprises a plurality of light-guiding lens components, and
where each of the display surfaces is allocated to one of the lens components, such that the light emitted by the respective display surface enters the respective lens component through an entry surface of such lens component.

4. The display device in accordance with claim 3, wherein the light-guiding lens is designed such that during operation of the display device, the light emitted by several display surfaces is emitted through the exit surface or through several exit surfaces adjoining each other,
wherein several display surfaces are displayed next to each other.

5. The display device in accordance with claim 1, wherein the at least one exit surface of the light-guiding lens comes into contact with the at least one display surface.

6. The display device in accordance with claim 1, wherein the deflection unit allocates different groups of pixels of the light emitted from the exit surface to different solid angles such that different contents can be transmitted in different solid angles.

7. The display device in accordance with claim 1, wherein the light-guiding lens comprises a plurality of fibers.

8. The display device in accordance with claim 1, wherein the display is an LED display or an OLED display or an LC display, or comprises an LED display or an OLED or an LC display.

9. A display device for a motor vehicle, the display device comprising:
at least one display with a display surface for displaying content, where the content is displayed on the at least one display surface by light emanating from a plurality of pixels of the at least one display surface;
a light-guiding lens with at least one entry surface and an exit surface;
wherein the light emitted from the at least one display surface enters the light-guiding lens through the at least one entry surface and is emitted by the exit surface such that the content is shown on the exit surface;
wherein the light-guiding lens includes, on the basis of the at least one display surface, an expanding cross-section;
wherein a cross-section of the light-guiding lens is shaped as a truncated cone or a truncated pyramid and a smaller diameter of the truncated cone or the truncated pyramid is facing the at least one display surface;
wherein at least one of:
the exit surface has a different shape than the at least one display surface;
the exit surface has a different size than the at least one display surface; and
the display device comprises several displays with display surfaces at distances to each other, and the light-guiding lens includes one or more exit surfaces adjoining each other.

10. A display device for a motor vehicle, the display device comprising:
at least one display with a display surface for displaying content, where the content is displayed on the at least one display surface by light emanating from a plurality of pixels of the at least one display surface;
a light-guiding lens with at least one entry surface and an exit surface;
wherein the light emitted from the at least one display surface enters the light-guiding lens through the at least one entry surface and is emitted by the exit surface such that the content is shown on the exit surface;
wherein light conduction within the light-guiding lens is based on Anderson localization;
wherein at least one of:
the exit surface has a different shape than the at least one display surface;
the exit surface has a different size than the at least one display surface; and
the display device comprises several displays with display surfaces at distances to each other, and the light-guiding lens includes one or more exit surfaces adjoining each other.

11. A display device for a motor vehicle, the display device comprising:
at least one display with a display surface for displaying content, where the content is displayed on the at least one display surface by light emanating from a plurality of pixels of the at least one display surface;
a light-guiding lens with at least one entry surface and an exit surface, the light-guiding lens comprising two transparent, light-guiding materials with differing refractive indices;
wherein the light emitted from the at least one display surface enters the light-guiding lens through the at least one entry surface and is emitted by the exit surface such that the content is shown on the exit surface;
wherein at least one of:
the exit surface has a different shape than the at least one display surface;
the exit surface has a different size than the at least one display surface; and
the display device comprises several displays with display surfaces at distances to each other, and the light-guiding lens includes one or more exit surfaces adjoining each other.

12. The display device in accordance with claim 11, wherein the two transparent, light-guiding materials with differing refractive indices are arranged at random in transverse directions to each other, where the transverse directions to the direction of propagation of the light propagated from the at least one entry surface to the exit surface are vertical.

13. A display device for a motor vehicle, the display device comprising:

at least one display with a display surface for displaying content, where the content is displayed on the at least one display surface by light emanating from a plurality of pixels of the at least one display surface;

a light-guiding lens with at least one entry surface and an exit surface;

wherein the light-guiding lens comprises a plurality of first fibers with a first refractive index and a plurality of second fibers with a second refractive index different from the first refractive index;

wherein the light emitted from the at least one display surface enters the light-guiding lens through the at least one entry surface and is emitted by the exit surface such that the content is shown on the exit surface;

wherein at least one of:
- the exit surface has a different shape than the at least one display surface;
- the exit surface has a different size than the at least one display surface; and
- the display device comprises several displays with display surfaces at distances to each other, and the light-guiding lens includes one or more exit surfaces adjoining each other.

14. The display device in accordance with claim 13, wherein the light-guiding lens is created by the plurality of the first and the second fibers or a plurality of fibers with air pockets in random arrangement being pressed together, warmed and pulled, so that melding of the various fibers or fibers with air pockets gives rise to an intermixed light-guiding material with at least two different refractive indices.

* * * * *